United States Patent
Suzuki et al.

(10) Patent No.: US 9,704,367 B2
(45) Date of Patent: Jul. 11, 2017

(54) CLEAN-ROOM MONITORING DEVICE AND METHOD FOR MONITORING CLEAN-ROOM

(71) Applicant: TOKYO ELECTRON LIMITED, Tokyo (JP)

(72) Inventors: Atsushi Suzuki, Sapporo (JP); Kazuya Uoyama, Nirasaki (JP); Yoshitaka Konishi, Sapporo (JP); Daisuke Oku, Sapporo (JP); Yoshitada Honda, Sapporo (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 270 days.

(21) Appl. No.: 14/590,401

(22) Filed: Jan. 6, 2015

(65) Prior Publication Data

US 2015/0124092 A1 May 7, 2015

Related U.S. Application Data

(63) Continuation of application No. PCT/JP2013/004102, filed on Jul. 2, 2013.

(30) Foreign Application Priority Data

Jul. 9, 2012 (JP) .................. 2012-153760

(51) Int. Cl.
*H04N 7/18* (2006.01)
*G08B 21/02* (2006.01)
(Continued)

(52) U.S. Cl.
CPC .............. *G08B 21/02* (2013.01); *F16P 3/142* (2013.01); *G08B 21/22* (2013.01); *H04N 7/183* (2013.01)

(58) Field of Classification Search
CPC ......... F16P 3/142; G08B 21/22; G08B 21/02; H04N 7/183
(Continued)

(56) References Cited

U.S. PATENT DOCUMENTS 5,189,836 A * 3/1993 Alder ..................... E04H 5/06
  137/234.6
7,173,648 B1 * 2/2007 Phan .................. G01N 21/8803
  348/87

(Continued)

FOREIGN PATENT DOCUMENTS

| CN | 101789160 A | 7/2010 |
| JP | H06-105312 A | 4/1994 |

(Continued)

*Primary Examiner* — Sath V Perungavoor
*Assistant Examiner* — Peet Dhillon
(74) *Attorney, Agent, or Firm* — Nath, Goldberg & Meyer; Jerald L. Meyer

(57) ABSTRACT

A clean-room monitoring device for monitoring the interior of a clean-room having a floor in which a removable cover such as a grating or a non-porous cover is disposed, includes: a monitoring camera which captures an image of the removable cover; a monitor which detects the existence of an opening exposed when the removable cover is removed, based on an image signal obtained from the monitoring camera, detects the presence of a workman approaching the opening if it is detected that the opening exists, and outputs a warning signal if the workman is detected; and a warning generator which receives the warning signal from monitor and issues a warning.

7 Claims, 3 Drawing Sheets

(51) Int. Cl.
*F16P 3/14* (2006.01)
*G08B 21/22* (2006.01)

(58) Field of Classification Search
USPC .......................................................... 348/143
See application file for complete search history.

(56) References Cited

U.S. PATENT DOCUMENTS

2002/0006675 A1* 1/2002 Shigaraki ............ G03F 7/70525
438/4
2004/0227816 A1* 11/2004 Sato ........................ F16P 3/142
348/152

FOREIGN PATENT DOCUMENTS

| | | |
|---|---|---|
| JP | 2000-194970 A | 7/2000 |
| JP | 2003-272061 A | 9/2003 |
| JP | 2004-276154 A | 10/2004 |
| JP | 2009-030837 A | 2/2009 |
| TW | M329650 | 4/2008 |
| TW | I326353 | 6/2010 |

* cited by examiner

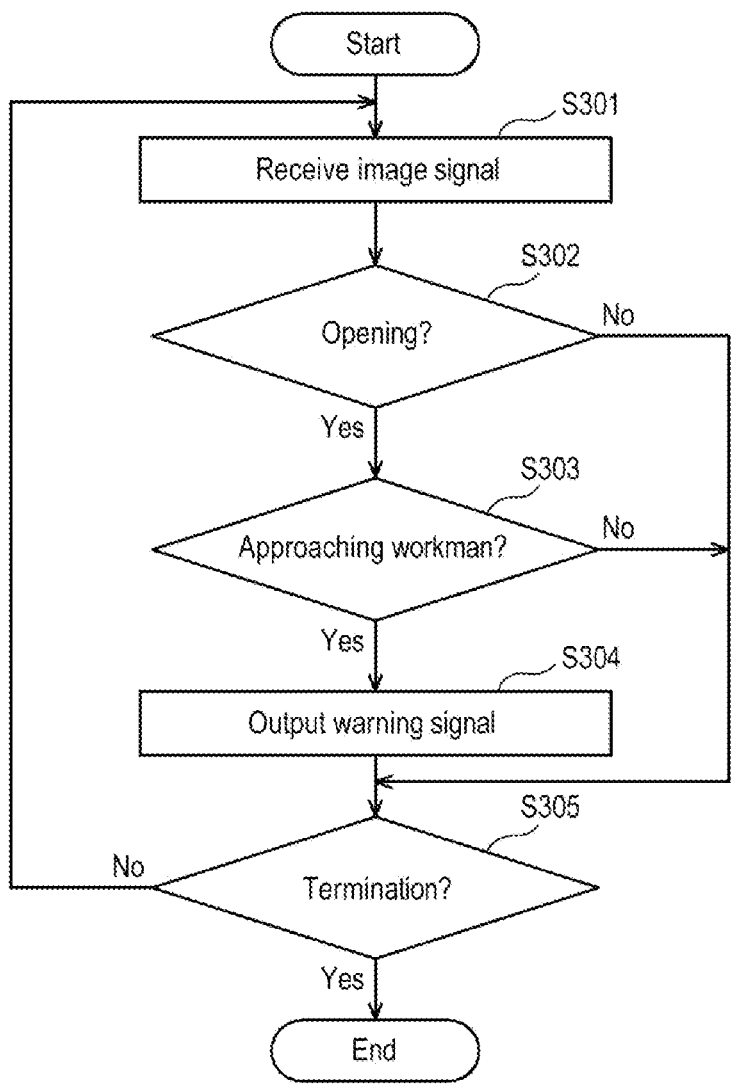

CLEAN-ROOM MONITORING DEVICE AND METHOD FOR MONITORING CLEAN-ROOM

CROSS-REFERENCE TO RELATED APPLICATIONS

This application is a Continuation Application of PCT International Application No. PCT/JP2013/004102, filed Jul. 2, 2013, which claimed the benefit of Japanese Patent Application No. 2012-153760, filed Jul. 9, 2012, the entire content of each of which is hereby incorporated by reference.

TECHNICAL FIELD

The present disclosure relates to a clean-room monitoring device and a method for monitoring a clean-room.

BACKGROUND

In the related art, e.g., in a semiconductor manufacturing line configured to manufacture semiconductor devices, a number of semiconductor manufacturing apparatuses have been arranged in a clean-room under a clean atmosphere. Inside the clean-room, a down flow of clean air is formed to flow from the ceiling toward the floor of the clean-room. Thus, dust found in the clean-room is allowed to be discharged out of the clean-room.

In order to form a down flow in such clean rooms, a grating having a number of apertures is placed in the floor of the clean-room. A space in which the down flow is distributed is placed below the grating. The grating can be removed. A workman can, for example, enter the space below the grating to perform work when the grating is removed.

However, since an opening is exposed in the floor when the grating is removed, there is a potential danger that the workman may fall into the space through the opening. To avoid this danger, attempts have been made to warn the workman by setting up a pylon or barricade tapes around the opening when the grating is removed. In addition, in order to prevent workmen from falling into openings on construction sites and so on, there has been proposed a device for supporting baseboards on or around such openings.

In such a device, a warning sign for a workman was provided by setting up a pylon or barricade tapes around the opening when the grating in the clean-room was removed. However, a pylon or barricade tapes may not be promptly set up right after removing the grating and the workman may not be aware of the existence of the opening at that time. Thus, an accident where the workman could fall into the opening is possible at that time. In addition, even if a pylon or barricade tapes are set up, the workman may not be aware of the existence of the pylon or barricade tapes. Thus, there is another possibility of an accident occurring where the workman could fall into the opening.

SUMMARY

The present disclosure provides some embodiments of a clean-room monitoring device and a clean-room monitoring method capable of preventing a workman from falling into an opening exposed when a removable cover for the opening (for example, a porous cover including a grating or a non-porous cover) is removed.

According to one embodiment of the present disclosure, there is provided a clean-room monitoring device for monitoring the interior of a clean-room having a floor in which a removable cover is disposed, including: a monitoring camera which captures an image of the removable cover; a monitor which detects the existence of an opening exposed when the removable cover is removed, based on an image signal obtained from the monitoring camera, detects the presence of a workman approaching the opening if it is detected that the opening exists, and outputs a warning signal if the workman is detected; and a warning generator which receives the warning signal from the monitor and issues a warning.

According to another embodiment of the present disclosure, there is provided a clean-room monitoring method for monitoring the interior of a clean-room having a floor in which a removable cover is disposed, including: capturing an image of the removable cover by means of a monitoring camera; detecting the existence of an opening exposed when the removable cover is removed, based on the captured image obtained from the monitoring camera in the step of capturing; detecting the presence of a workman approaching the opening if it is detected that the opening exists in the step of detecting the existence of the opening; and issuing a warning if the workman is detected approaching the opening in the step of detecting the presence of the workman approaching the opening.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 4 is a flow chart illustrating a clean-room monitoring operation.

DETAILED DESCRIPTION

Embodiments of the present disclosure will now be described in detail with reference to the accompanying drawings.

Figure 1:
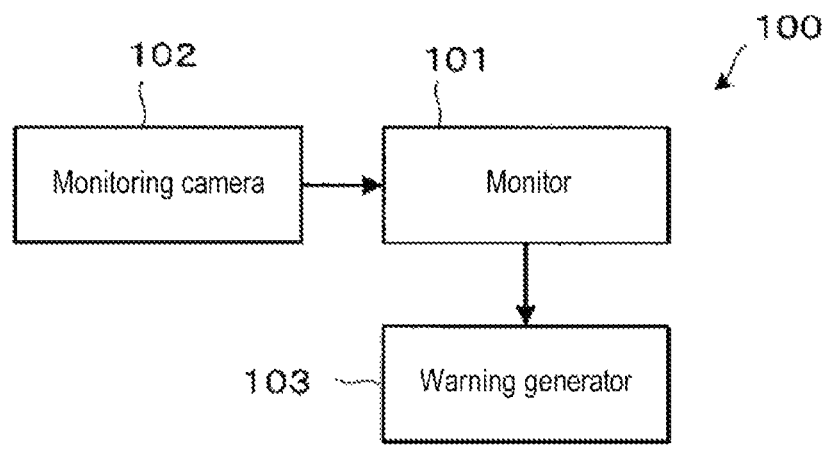
FIG. 1 is a view illustrating a general configuration of a clean-room monitoring device according to one embodiment of the present disclosure.

FIG. 1 is a block diagram illustrating a general configuration of a clean-room monitoring device according to one embodiment of the present disclosure. Referring to FIG. 1, a clean-room monitoring device 100 includes a monitor 101 implemented with a computer or the like, a monitoring camera 102 such as a digital camera or the like, and a warning generator 103 configured to generate a warning with light, a warning signal and so on. The warning generator 103 includes, for example, a revolving light, a speaker configured to emit a warning sound, etc.

Figure 2:
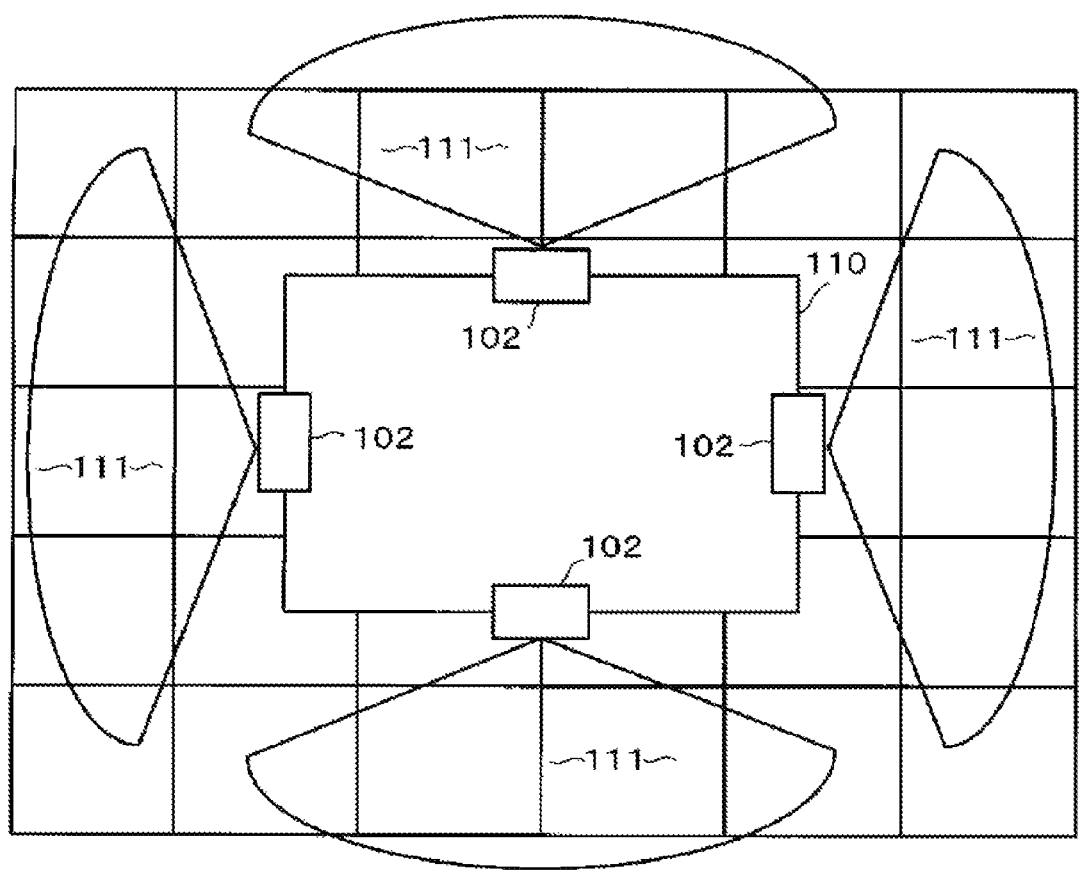
FIGS. 2 and 3 are views for illustrating an example of an installation state of the clean-room monitoring device.

Referring to FIG. 2, monitoring cameras 102 are installed on the top surface of semiconductor manufacturing apparatuses 110 arranged in the clean-room. The monitoring cameras 102 capture an image of the floor (for example, including a removable cover such as a grating or a non-porous cover) of the clean-room from above. In the floor of the clean-room, a removable cover may be disposed through which a down flow of clean air formed from the ceiling toward the floor is introduced into a space below the floor. In some embodiments, the removable cover may be a grating or any other type of cover with at least one pore through which a down flow of clean air from the ceiling toward the floor is introduced into the space below the floor. In some other embodiments, the removable cover may be a non-porous cover that may be disposed to cover a pore or aperture formed on the floor. In such case, the down flow of clean air from the ceiling toward the floor may be introduced into the space below the floor through a gap between the removable cover and the pore on the floor or some other type of a ventilation mechanism. Depending on the type of clean-room, the height of the space below the removable cover is, for example, 1 to 5 meters. Therefore, it could be very dangerous when a workman falls into the space in the floor of the clean-room.

The monitoring cameras 102 are provided to capture the image of the floor (removable cover) in passages formed between the semiconductor manufacturing apparatuses 110. In the example shown in FIG. 2, passages 111 in which the workman can pass through surround the semiconductor manufacturing apparatuses 110. Four monitoring cameras 102 are arranged to image the passages 111 all around the semiconductor manufacturing apparatuses 110.

Figure 3:
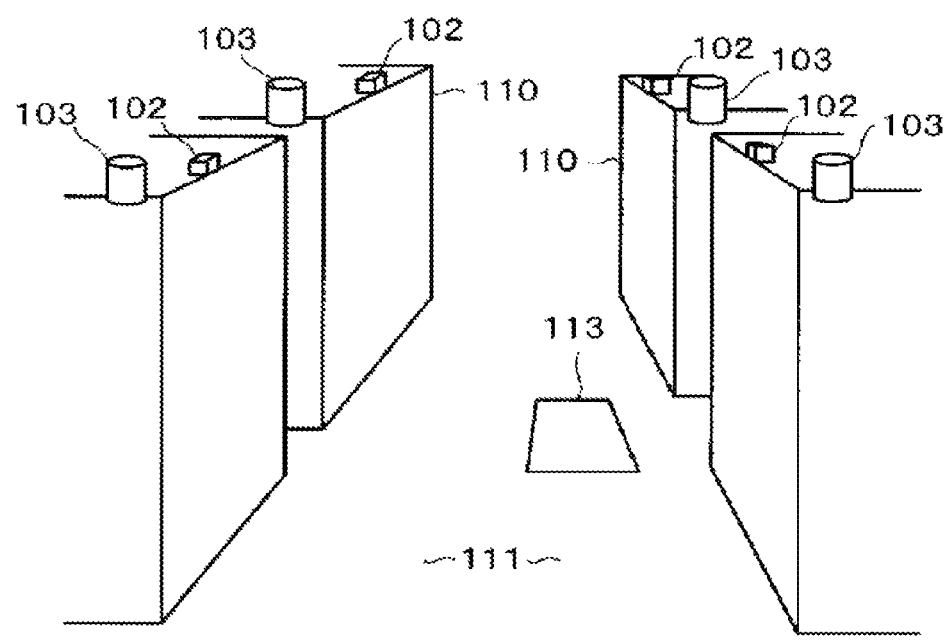

As shown in FIG. 3, a plurality of the semiconductor manufacturing apparatuses 110 is arranged in the clean-room. The monitoring cameras 102 are installed in the semiconductor manufacturing apparatuses 110 in such a manner that removable covers in all passages in the clean-room can be seen by one of the monitoring cameras 102. It is shown in the example of FIG. 3 that the warning generators 103 are arranged in the semiconductor manufacturing apparatuses 110. However, the warning generators 103 may be arranged in places other than the semiconductor manufacturing apparatuses 110.

In the example of FIG. 3, some of the removable covers are removed and an opening 113 is exposed in the floor. The monitor 101 analyzes image signals from the monitoring cameras 102 and monitors whether or not the opening 113 is exposed in the clean-room.

As described above, the monitoring cameras 102 are installed in such a manner that the removable covers in all passages in the clean-room can be seen by one of the monitoring cameras 102. Therefore, when any removable covers is removed in the passages 111 in the clean room, any one of the monitoring cameras 102 can detect the removal, thereby detect that the opening 113 is exposed.

The monitoring cameras 102 may be installed in places other than the semiconductor manufacturing apparatuses 110, such as the ceiling or walls of the clean-room. In addition, the monitoring cameras 102 may be used in combination with the monitoring cameras 102 arranged in areas other than the semiconductor manufacturing apparatuses 110, such as the ceiling or walls of the clean-room.

Next, an operation of the clean-room monitoring device 100 will be described with reference to a flow chart of FIG. 4.

Upon starting a clean-room monitoring operation by the clean-room monitoring device 100, the monitor 101 receives an image signal for the floor (removable cover) of an imaged passage 111 from each monitoring camera 102 (Step S301).

Next, the monitor 101 analyzes the image signal received from each monitoring camera 102. Then, the monitor 101 determines whether or not the removable cover is removed from the floor of the passage 111 and whether there exists a section where an opening 113 is exposed in the passage 111 (Step S302).

If it is determined that there are no sections where an opening 113 is exposed in the passage 111, the monitor 101 determines whether to terminate the monitoring process of the passage 111 (Step S305). If it is determined that the process is not to be ended, the operation at Step S301 is repeated. If it is determined that the process is to be ended, the process for monitoring is ended.

On the other hand, if it is determined in Step S302 that the removable cover is removed and the opening 113 is exposed in the passage 111, the monitor 101 determines whether or not a workman approaches the opening 113 (Step S303).

If it is determined that no workman approaches the opening 113, the monitor 101 determines whether to terminate the monitoring process (Step S305). If it is determined that the process is not to be ended, the operation from Step S301 is repeated. If it is determined that the monitoring process is to be ended, the process for monitoring is ended (Step S306).

If it is determined that a workman approaches the opening 113, a warning signal is outputted from the monitor 101 to the warning generator 103 to issue a warning with light, warning sound or the like (Step S304). The warning from the warning generator 103 allows the workman approaching the opening 113 to be alerted to an imminent dangerous situation, thereby preventing the workman from falling into the opening 113.

Next, the monitor 101 determines whether to terminate the process (Step S305). If it is determined that the process is not to be ended, the operation from Step S301 is repeated. If it is determined that the process is to be ended, the process for monitoring is ended.

As described above, in the clean-room monitoring device and the clean-room monitoring method according to this embodiment, when a removable cover in the clean-room is removed to expose an opening 113 in the floor of the clean-room, the opening 113 is automatically detected and a warning is issued when a workman approaching the opening 113 is detected, thereby calling to the attention of the workman an imminent danger. Accordingly, even in a case where a pylon or barricade tapes around the opening 113 is not set up, the workman is alerted to perceive the existence of the opening 113. Thus, it is possible to prevent the workman from falling into the opening 112 exposed when the removable cover is removed.

According to the present disclosure, it is possible to provide a clean-room monitoring device and a clean-room monitoring method capable of preventing a workman from falling into an opening exposed when a removable cover for the opening is removed.

It is to be understood that the present disclosure is not limited to the disclosed embodiment but various modifications can be made.

The clean-room monitoring device and the clean-room monitoring method of the present disclosure can be utilized in the manufacture of substrates for semiconductor devices and flat panel displays, solar cell panels and so on and thus has industrial applicability.

What is claimed is:

1. A clean-room monitoring device for monitoring the interior of a clean-room having a floor in which a removable cover is disposed, comprising:
   a monitoring camera which captures an image of the removable cover of the floor in a passage in which a workman can pass through;
   a monitor which detects whether there exists an opening exposed when the removable cover is removed, based on an image signal obtained from the monitoring camera, detects the presence of the workman approaching the opening if it is detected that the opening exists based on an image signal obtained from the monitoring camera, and outputs a warning signal if the workman is detected; and
a warning generator which receives the warning signal from the monitor and issues a warning.

2. The clean-room monitoring device of claim 1, wherein a plurality of monitoring cameras is arranged with semiconductor manufacturing apparatuses installed in the clean-room.

3. The clean-room monitoring device of claim 1, wherein the warning generator issues a warning by a light and sound.

4. The clean-room monitoring device of claim 1, wherein a plurality of warning generators is arranged with semiconductor manufacturing apparatuses installed in the clean-room.

5. The clean-room monitoring device of claim 1, wherein the removable cover is a grating, a porous cover or a non-porous cover.

6. A clean-room monitoring method for monitoring the interior of a clean-room having a floor in which a removable cover is disposed, comprising:
    capturing an image of the removable cover of the floor in a passage in which a workman can pass through using a monitoring camera;
    detecting whether there exists an opening exposed when the removable cover is removed, based on the captured image obtained from the monitoring camera;
    detecting the presence of workman approaching the opening if it is detected that the opening exists in detecting whether there exists the opening, based on an image signal obtained from the monitoring camera; and
    issuing a warning if the workman is detected approaching the opening in detecting the presence of the workman.

7. The clean-room monitoring method of claim 6, wherein the removable cover is a grating, a porous cover or a non-porous cover.

* * * * *

UNITED STATES PATENT AND TRADEMARK OFFICE
CERTIFICATE OF CORRECTION

PATENT NO. : 9,704,367 B2  
APPLICATION NO. : 14/590401  
DATED : July 11, 2017  
INVENTOR(S) : Atsushi Suzuki et al.

Page 1 of 1

It is certified that error appears in the above-identified patent and that said Letters Patent is hereby corrected as shown below:

In the Claims

Claim 6, Column 6, Line 10, please insert the word --the-- between "detecting the presence of" and "workman".

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*